(12) United States Patent
Remy et al.

(10) Patent No.: US 8,056,344 B2
(45) Date of Patent: Nov. 15, 2011

(54) GAS TURBINE ENGINE AND METHOD FOR REDUCING TURBINE ENGINE COMBUSTOR GASEOUS EMISSION

(75) Inventors: Sebastien Remy, Cazeres (FR); Jean Botti, Paris (FR)

(73) Assignee: Airbus SAS, Blagnac Cedex (FR)

( * ) Notice: Subject to any disclaimer, the term of this patent is extended or adjusted under 35 U.S.C. 154(b) by 1041 days.

(21) Appl. No.: 11/861,014

(22) Filed: Sep. 25, 2007

(65) Prior Publication Data
US 2009/0301096 A1    Dec. 10, 2009

(51) Int. Cl.
F02C 3/22 (2006.01)
F02C 7/22 (2006.01)
F02C 9/26 (2006.01)
F02C 9/28 (2006.01)

(52) U.S. Cl. .............. 60/776; 60/39.281; 60/39.463; 60/742; 60/39.465

(58) Field of Classification Search ............ 60/39.463, 60/39.465, 39.461, 742, 39.281, 776, 778
See application file for complete search history.

(56) References Cited

U.S. PATENT DOCUMENTS

| | | | |
|---|---|---|---|
| 5,252,860 A * | 10/1993 | McCarty et al. | 60/773 |
| 5,319,935 A * | 6/1994 | Toon et al. | 60/733 |
| 5,694,760 A | 12/1997 | Baxter | |
| 5,732,546 A | 3/1998 | Pineo et al. | |
| 6,199,366 B1 * | 3/2001 | Murata et al. | 60/785 |
| 6,609,378 B2 * | 8/2003 | Scott | 60/39.463 |
| 6,640,548 B2 * | 11/2003 | Brushwood et al. | 60/39.463 |
| 2004/0226299 A1 * | 11/2004 | Drnevich | 60/39.465 |
| 2006/0156729 A1 | 7/2006 | Sprouse et al. | |

* cited by examiner

Primary Examiner — Ted Kim
(74) Attorney, Agent, or Firm — Crowell & Moring LLP

(57) ABSTRACT

In a turbine engine hydrogen is injected into the combustor in response to a power output level of the turbine engine. In a preferred embodiment, gaseous hydrogen is always injected at low-power operations and switched off at mid-power and high-power operations.

6 Claims, 3 Drawing Sheets

GAS TURBINE ENGINE AND METHOD FOR REDUCING TURBINE ENGINE COMBUSTOR GASEOUS EMISSION

FIELD OF THE INVENTION

The present invention relates generally to turbine engines used in aeronautics but also to turbine engines for industrial and marine applications. More specifically, the present invention refers to a reduction of gaseous emissions of gas turbine engines.

BACKGROUND OF THE INVENTION

A gas turbine engine includes a core having a compressor fixedly joined to a turbine by a core rotor extending axially therebetween. At least one combustor, for example an annular combustor or a plurality of combustor chambers distributed around the core, are disposed between the compressor and the turbine and include fuel injectors. The fuel injectors may be joined to a fuel control valve which meters fuel into the at least one combustor during operation.

The compressor includes one or more stages of circumferentially spaced apart compressor rotor blades and cooperating compressor stator vanes through which air is channeled during operation for increasing the pressure thereof. The pressurized air is discharged from the compressor and mixed with fuel in the combustor and suitably ignited for generating hot combustion gas which flows downstream therefrom and through the turbine. The turbine includes one or more stages of turbine rotor blades circumferentially spaced apart from each other, with cooperating turbine nozzle vanes expanding the combustion gas and extracting energy therefrom.

The engine also includes a suitable controller for controlling the various components thereof over a large range of rotor speed and output power.

Examples of known gas turbines which are suitable for use as aircraft engines are disclosed in U.S. Pat. No. 5,694,760, incorporated herein by reference and U.S. Pat. No. 5,732,5469, also incorporated herein as reference.

Thus, it is generally know in the art to power turbines with gases expelled from combustion chambers. These gas powered turbines can produce power for many applications such as aeronautics, but also terrestrial power plants or as power sources of ships. In the gas powered turbine the fuel is combusted in an oxygen rich environment. In the very most cases, the fuel is a hydrocarbon fuel, i.e. the fuel on the basis of hydrocarbon compounds, such as methane, natural gas, gasoline or kerosene. Generally, these combustion systems may emit undesirable compounds such as nitrous oxide compounds (NOX) and carbon-containing compounds. It is generally desirable to decrease various emissions as much as possible so that selected compounds may not enter the atmosphere. In particular, it has become desirable to reduce NOX emissions to a substantially low level.

Various attempts have been made to reduce gaseous emissions of turbine engine combustors. For example, in US 2006/0156729 A1, a catalytic combustor and method for substantially eliminating various emissions is disclosed using a catalytic structure within a combustor chamber. Within the catalyst, the temperature of the air is increased to an auto-ignition temperature which ignites a further part of the fuel that is added later. To achieve a prescribed temperature of the catalysts, hydrogen gas is used during a start-up to power the gas turbine.

Such known gas turbine engines have the disadvantage that the catalysts are heavy and take up considerable space within the combustor chamber. Hence, the whole arrangement is bulky, heavy and complicated.

Hitherto, turbine engine combustor size has been the result of a trade-off between antagonist requirements:
a) at low turbine engine power, the relatively low speed combustion kinetics require a large combustor to mitigate un-burnt hydrocarbon and carbon monoxide emissions.
b) on the other hand, at high turbine engine power, a small combustor is desirable to minimize nitrogen oxide emissions (NOX), since NOX formation, which takes place at high temperatures, is slower than combustion.

Current turbine engine combustors are a good compromise between low and high power requirements.

However, the quest for ever more fuel-efficient turbine engines paves the way to very high bypass ratio, and very high pressure ratio turbine engines. Such turbine engines exhibit high pressure and high temperature at combustor inlets during high power operations. This is detrimental to NOX emissions. In addition, environmental concerns have led, and are likely to lead, to more and more stringent NOX certification requirements.

It is an object of the invention to reduce turbine engine combustor emissions of turbine engines that are operated over a large output power range.

A further object of the invention is to reduce gaseous turbine engine combustor emissions without increasing the size or weight of the combustor.

It is a further object of the invention to reduce the size and weight of the combustor without a negative effect on turbine engine combustor emissions.

It is a further object of the invention to provide gas turbine engines with a high bypass ratio and a very high pressure ratio, but low NOX emissions.

SUMMARY OF THE INVENTION

To achieve the above-mentioned goals, the invention provides, according to one aspect thereof, a method for operating a gas turbine engine having a compressor joined to a turbine by a core rotor, with at least one combustor disposed therebetween for receiving compressed air from said compressor and fuel for providing combustion gas to be discharged to said turbine, the method comprising supplying a hydrocarbon fuel to the combustor and injecting hydrogen into said combustor in response to a gas turbine power output level.

Thus, the present invention is directed to a method for operating a gas turbine engine that has a compressor joined to a turbine by a core rotor and at least one combustor disposed between the compressor and the turbine. The combustor receives compressed air from said compressor and fuel for providing combustion gas to be discharged to said turbine. According to the present invention, a hydrocarbon fuel is supplied to the combustor. Additionally, hydrogen is injected into said combustor at least during low power operations.

By injection of hydrogen, combustion kinetics is accelerated, so that the combustor size can be small even for low turbine engine power conditions without the risk of un-burnt hydrocarbon and carbon monoxide emissions. Thus, a smaller combustor size can be used without a negative effect for low turbine engine power. The smaller combustor size is advantageous for high turbine engine power conditions to minimize NOX emissions. For high power output operation and a mid-power output operation, hydrogen injection may be stopped to reduce consumption of hydrogen.

Hence, one basic idea of the invention is to control injection of hydrogen in response to a turbine power output level or turbine power output condition.

A further basic idea of the invention is to use gaseous hydrogen injection in the turbine engine combustor for low power operations. Hydrogen injection may be stopped for mid-power and high power operations.

Thanks to the gaseous hydrogen injection for low power operations, combustion kinetics is accelerated, which enables of a smaller turbine engine combustor to be used at given low power engine emissions.

As a consequence, the smaller size turbine engine combustor allows less time for NOX formation at high power, hence yielding reduced turbine engine combustor NOX emissions.

According to an advantageous embodiment of the present invention, the gas turbine engine is operable in a power range that includes at least a high-power condition and a low-power condition. Hydrocarbon fuel is supplied to the combustor during both the high-power and low-power conditions. Hydrogen is injected into the combustor at least during the low-power condition. When turbine power output is decreased, the mass flow of hydrogen which is injected into the combustor is increased. Hence, it is ensured that more hydrogen is injected at the low-power condition, so that combustion kinetics is accelerated in said low-power condition. Less or no hydrogen is injected during the high-power condition. Hence, according to a further advantageous embodiment, the mass flow of hydrogen which is injected into said combustor is decreased as the turbine power output is increased.

Increasing of the mass flow of hydrogen can simply be done by starting the hydrogen injection from zero to a given mass flow. Hence, according to one possible embodiment of the invention, a hydrogen supply simply is switched on when changing from high-power or mid-power conditions to the low-power condition, and is switched off when changing from low-power condition to mid-power or high-power conditions.

According to a further embodiment, an actual power condition is detected and compared to a switch power level for switching on/off the hydrogen injection. Preferably, the actual power condition is determined indirectly by detecting a parameter which is related to the actual power condition. The actual power condition can be determined from the actual core flow of gases flowing through the core of the engine. However, in many gas turbine engines, core flow is not directly measured. Therefore, one suitable control parameter related to the actual power condition can be a temperature at the combustor inlet, e.g. the turbine engine combustor inlet total temperature. For example, in practical embodiments, it may be advisable to shut off gaseous hydrogen injection when the turbine engine combustor inlet total temperature exceeds a value between 450 and 550° K. In many cases, combustor inlet total temperature is also not directly measured on the turbine engine. However, a turbine engine control system can easily recalculate combustor inlet total temperature based on a turbine engine model which uses measured parameters such as turbine engine core speed and ambient conditions, for example ambient static pressure and temperature for industrial or marine turbine engines, or ambient static temperature, total pressure and total temperature for aviation turbine engines.

Examples for turbine engine control systems using a turbine engine model are given in U.S. Pat. No. 5,694,760 and U.S. Pat. No. 5,732,546, incorporated herein by reference.

A similar turbine engine control system could also be used in controlling the gaseous hydrogen flow to the turbine engine.

A low power range where hydrogen is injected can range between zero and 35% of the maximum power output. Hence, a switch power level for switching on/off the hydrogen injection can be chosen between 30% and 40% of the maximum output power level. Within the low power range between zero and the switch power level, the proportion of hydrogen can be between 5 and 15% of the total mass flow of fuel and hydrogen which is supplied to the combustor. In one embodiment, the mass flow of hydrogen can be adjusted in response to the actual power output. This can be done by using a schedule of hydrogen flow versus said actual power condition.

As mentioned before, the actual power condition can be determined indirectly by the core flow or by the total temperature at the combustor inlet that is calculated from other measured parameters.

A gas turbine engine according to a further aspect of the invention comprises a compressor joined to a turbine by a core rotor; at least one combustor disposed between said compressor and turbine for receiving compressed air from said compressor and hydrocarbon fuel for producing combustion gas discharged to said turbine; a hydrogen injection arrangement for injecting hydrogen into said combustor; and a controller for controlling said hydrogen injection arrangement in response to a power output level.

According to an embodiment of the invention, the hydrogen injection arrangement may include at least one valve which is configured at least for starting and stopping hydrogen supply to said combustor and which can be controlled by the controller for injecting hydrogen into the combustor at least during a low power condition.

The valve may be simply a shut-on/shut-off valve. However, for a better adaptation of the hydrogen consumption according to the actual power condition, a valve that is adapted to regulate or meter a mass flow of hydrogen is preferred. Such regulation or metering can be controlled by the controller in response to an increase or decrease of the actual turbine power output.

Further, it is preferred to introduce pressurized gaseous hydrogen at the turbine engine combustor inlet close to the fuel nozzle, in order to enhance turbulent mixing for homogeneous burning.

It is preferred to stop hydrogen injection for mid power and high power operation. This reduces the hydrogen consumption. Thus, less complicated and smaller equipment for storage and/or (online-)production of hydrogen can be used. Further, at medium to high power, and for engines operating with a rich primary zone, there will be no particular advantage in additional injection of hydrogen. Actually, there could be the risk of operating the turbine engine combustor at a leaner condition which could lead to an increase in NOX emissions.

For example, a low-power operation can be defined between zero and approximately 35% of maximum power output, e.g. between zero and about 35% maximum core flow. Mid-power operation can be defined between 35% and 70% of maximum output power or maximum core flow. High-power operation can be defined above 70% maximum output power or core flow.

The invention can be applied to gas turbine engines for aeronautics, marine applications and industrial power production. However, the invention is most particularly appropriate for aviation, because aircraft turbine engines are routinely operated at low power for extended periods of times. For example, aircraft engines run at low power while taxiing. Hence, the invention is particularly useful for reducing gaseous emissions of aircraft turbines at airports or the like.

Furthermore, the natural antagonist requirements for low carbon monoxide, unburnt hydrocarbons, and low NOX, are particularly acute for aviation.

However, the invention can also be used for other applications of gas turbine engines. For example, up to the present, industrial power generating gas turbine engines have normally been operated at a single point of high power operation, namely at peak efficiency. However, such gas turbine engines are widely used in power plants for generating electrical power. Since more and more alternative power sources are used in electrical power generation, the changes in the power outputs of such regenerative energy sources (wind, solar, water energy) must be compensated. This can be done by operating gas turbine engines at different power levels. Thus, it is more and more likely that industrial gas turbine engines will also be operated at different output power level for compensating the fluctuation in electrical power supply from regenerative energy sources. Thus, the invention will become more and more important for other applications, too.

BRIEF DESCRIPTION OF THE DRAWINGS

The invention will be more fully understood from the following detailed description of a preferred embodiment taken in conjunction with the accompanying drawings in which.

DETAILED DESCRIPTION OF PREFERRED EMBODIMENTS

Figure 1:
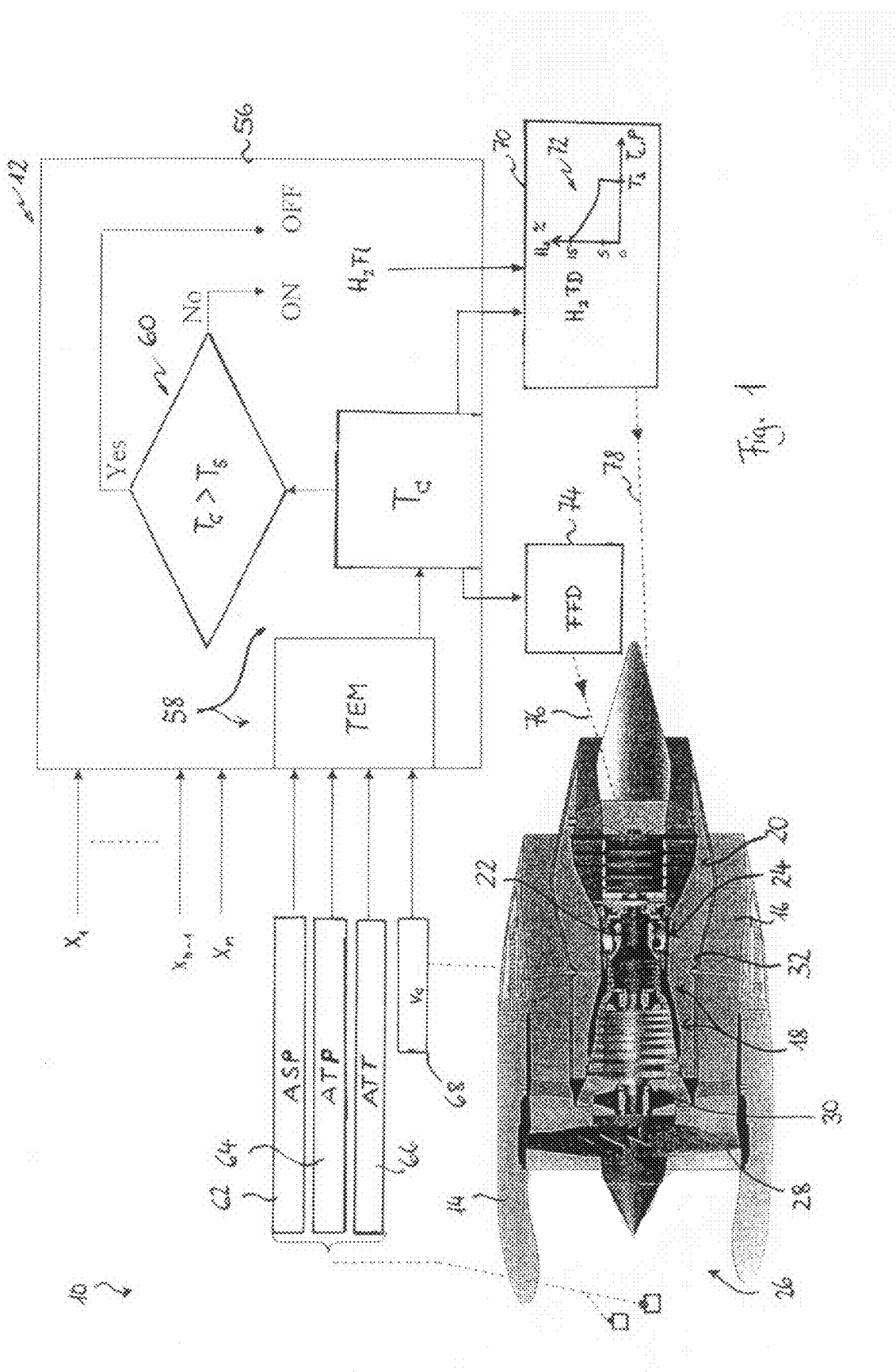
FIG. 1 is a schematic illustration of an aviation gas turbine engine having a turbine engine control system.

FIG. 1 shows a gas turbine engine 10 with a turbine engine control system 12. The gas turbine engine 10 is adapted to be used as an aviation turbine engine and includes an outer housing 14 with a bypass duct 16; a compressor 18; a turbine 20; a core rotor 22 joining the compressor 18 and the turbine 20; and an annular combustor 24 between the compressor 18 and the turbine 20. At an inlet 26 of the housing 14, a fan 28 is connected to the core rotor 22. The compressor 18, the turbine 20 and the core rotor 22 form the core 30 of the gas turbine engine 10 which is enclosed by an inner housing 32. The inner housing 32 is surrounded by the bypass duct 16.

The compressor 18 compresses air entering the housing 14 through the inlet 26 and discharges the pressurized air to the combustor 24. In the combustor 24, the pressurized air is mixed with fuel. The air/fuel mixture is ignited to generate hot combustion gas which flows downstream from the combustor through the turbine 20. The turbine 20 extracts energy from the expanding combustion gas.

Figure 2:
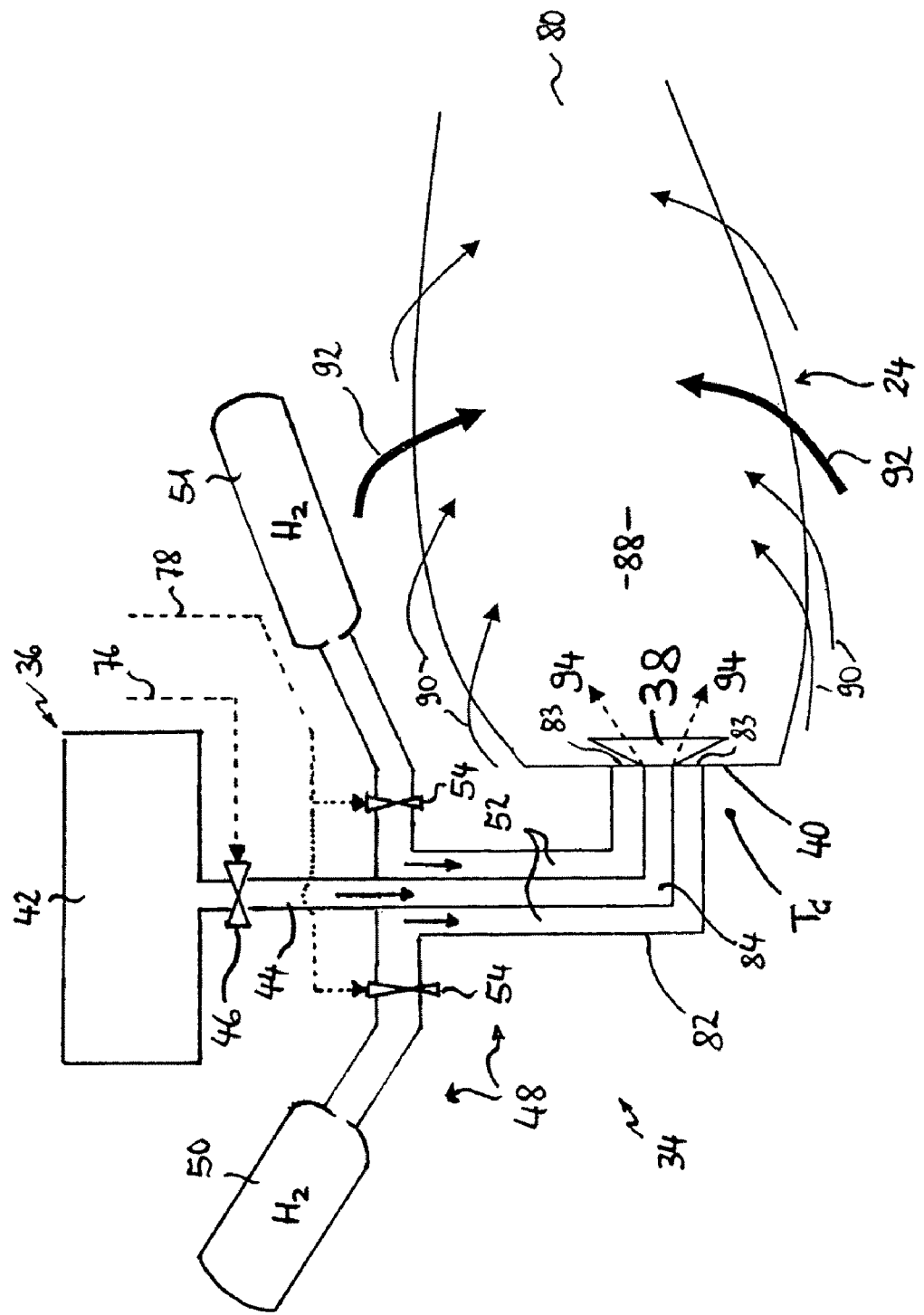
FIG. 2 is a schematic view illustrating a low-power operation of a combustor of said gas turbine engine of FIG. 1 with a fuel supply and a hydrogen injection arrangement for injecting hydrogen during the low-power operation.
Figure 3:
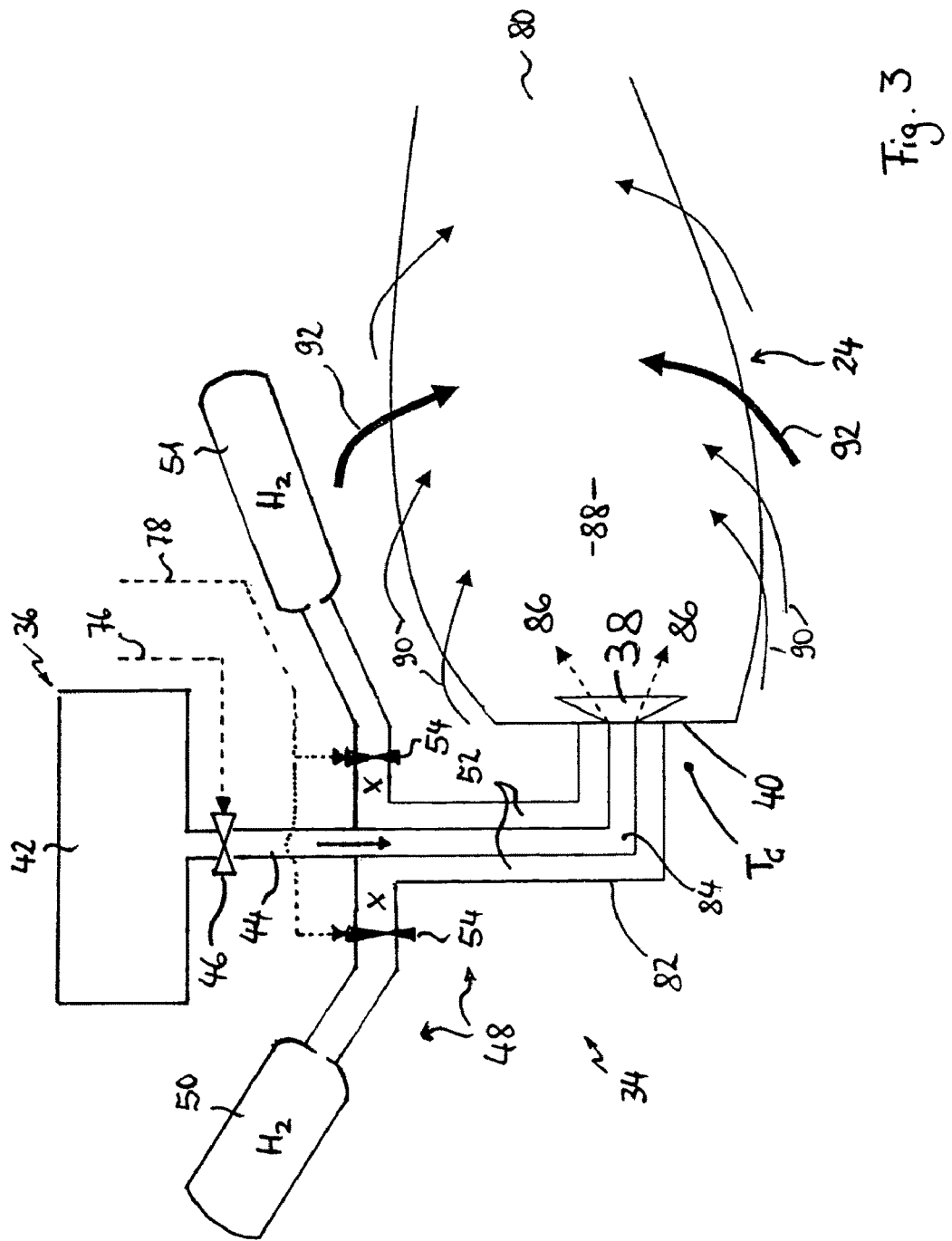
FIG. 3 is a schematic view similar to FIG. 2 illustrating a high power operation of the combustor.

The combustor 24 is schematically shown in FIGS. 2 and 3 together with a fuel supply arrangement 34. The fuel supply arrangement 34 includes a hydrocarbon fuel supply 36 for supplying a hydrocarbon fuel to a nozzle 38 at a combustor inlet 40. The hydrocarbon fuel supply 36 further includes at least one fuel tank 42 to be filled with the hydrocarbon fuel, a fuel duct 44 and a first controllable valve 46 for metering hydrocarbon fuel into the combustor 24.

The fuel supply arrangement 34 further includes a hydrogen-injection arrangement 48 for injecting gaseous hydrogen into the combustor. The hydrogen-injection arrangement 48 includes a source of gaseous hydrogen, here represented for example by gas containers 50, 51; hydrogen duct 52; and second controllable valves 54 for closing and opening the hydrogen ducts 52. In the preferred embodiment, the second controllable valves 54 are further adapted to meter hydrogen into the combustor 24 by regulating the hydrogen mass flow through the respective hydrogen duct 52. The hydrogen ducts 52 are connected to the combustor inlet 40 for injecting pressurized gaseous hydrogen in close proximity to the nozzle 38.

Referring now to FIG. 1 again, the turbine engine control system 12 has a controller 56 for controlling the hydrogen injection in response to an power output condition of the gas turbine engine 10. The controller 56 further controls the hydrocarbon fuel supply 36 for supplying fuel according to the needs.

The controller 56 includes an actual power detector 58 for detecting an actual power condition and comparing means 60 for comparing said actual power condition with a preset parameter indicating a switch power level. The actual power detector 58 and the comparing means 60 can—as well as further portions of the controller or the turbine engine control system 12—be implemented as software loaded into a microprocessor (not shown) of the controller 56.

The actual power detector 58 is connected to a first ambient pressure sensor 62 for sensing an ambient static pressure ASP at the inlet 26 of the gas turbine engine 10, with a second ambient pressure sensor 64 for detecting an ambient total pressure ATP at the inlet 26 of the gas turbine engine 10, with an ambient temperature sensor 66 for detecting an ambient total temperature ATT at the inlet 26 of the gas turbine engine 10, and with a speed sensor 68 for detecting a core speed $v_C$ at which the core rotor 22 rotates. The actual power detector 58 calculates a calculated combustor inlet total temperature $T_C$ which is a parameter representing the actual power output according to a known turbine engine model TEM from the outputs of the sensors 62, 64, 66 and 68.

The comparing means 60 compares the calculated combustor inlet total temperature $T_C$ with a switch temperature $T_S$ which is a parameter representing a switch power level dividing a low-power condition from a mid-power condition.

The controller 56 controls the second controllable valves 54 so that the valves are in a closed condition, when the calculated combustor inlet total temperature $T_C$ is greater than the switch temperature $T_S$. When the calculated combustor inlet total temperature $T_C$ is smaller than or equal to the switched temperature $T_S$, the controller 56 controls the second controllable valves 54 so that the hydrogen ducts 52 are open. Thus, the gaseous hydrogen flow $H_2Fl$ is controlled in response to an actual power condition.

The calculated combustor inlet total temperature $T_C$ is further supplied to a gaseous hydrogen flow demand control unit 70 regulating the gaseous hydrogen flow demand $H_2FD$ during the low-power operation according to a schedule 72. The schedule 72 is a predetermined function of the desired mass flow of hydrogen $H_2$ versus the calculated combustor inlet total temperature $T_C$ which represents the actual power output level P.

Further, the calculation of the combustor inlet total temperature $T_C$ according to the turbine engine model TEM is used to control the fuel flow demand FFD. Hence, the calculated combustor inlet total temperature $T_C$ is supplied to a fuel flow demand control unit 74 for controlling the fuel flow demand in response to the inlet total temperature $T_C$ representing the actual power output level P.

The fuel flow demand control unit 74 is connected to the first controllable valves 46 via a first line 76. The gaseous hydrogen flow demand control unit 70 is connected to the second controllable valves 54 via a second line 78.

Referring now again to FIGS. 2 and 3, the combustor 24 has a size, for example a length between the combustor inlet 40 and the combustor exit 80 or more particularly a volume of the combustion chamber, which size is smaller than that of combustors of similar known gas turbine engines. For example, the size is reduced by approximately 5 to 15%, probably by about 10%.

FIG. 3 shows an operation at mid-power or high-power condition. In a power output range between a switch power level, represented by the switch temperature $T_S$ in FIG. 1, and the maximum power output, the controller 56 keeps the second controllable valves 54 in a closed state. No gaseous hydrogen is injected at the combustor inlet 40. A hydrogen injector 82 is shut off. A fuel injector 84 injects hydrocarbon fuel through the nozzle 38 into the combustor inlet 40. A mixture of fuel and air 86 is present in a primary zone 88 of the combustor 24. This mixture—fuel and air 86—is ignited in a known way. The gases are mixed with cooling air 90, and further downstream in the combustor 24 with dilution air 92. Due to the reduced combustor size, the length time of the air stays within the combustor 24 is shortened, so that NOX emissions are lowered compared to those of the usual combustor sizes.

In FIG. 2, an operation of the combustor 24 at low-power condition is illustrated. The calculated combustor inlet total temperature $T_C$ is equal to or smaller than the switch temperature $T_S$. This indicates that the actual power output level P is smaller than a switch power level dividing a low-power subrange of the whole power output range from mid-power and low-power operations.

In low power operations, the controller 56 opens the second controllable valves 54. The hydrogen injector 82 is active and conducts hydrogen via at least one hydrogen nozzle 83 into the combustor 24. Thus, for low-power operations, pressurized gaseous hydrogen is introduced at the turbine engine combustor inlet 40, close to the fuel nozzle 38 in order to enhance turbulent mixing for homogeneous burning.

In the turbine engine combustor primary zone 88, hydrogen burns and accelerates combustion kinetics before dilution of the gases by the dilution air 92. Thus, the emissions of un-burnt hydrocarbon and carbon monoxide are minimized. The introduction of a pressurized gaseous hydrogen leads to a homogeneous mixture of fuel, air and hydrogen 94 in the primary zone 88.

During the low-power operation, the mass flow of hydrogen is controlled by the gaseous hydrogen flow demand control unit 70 according to the given schedule 72. The lower the actual power output level is, the more hydrogen is injected. The mass flow of hydrogen is, for example, regulated between 15% and 5% of the total mass flow of hydrocarbon fuel and hydrogen that is injected into the combustor 24.

The fuel flow demand FFD is controlled over the whole power range—for low-power, mid-power and high-power operations—by the fuel flow demand control unit 74.

For midpower or high-power operations, pressurized gaseous hydrogen can be turned off, as illustrated in FIG. 3, for instance for turbine engine combustors 24 the primary zone 88 of which is rich in fuel at mid-power or high-power operations.

In further embodiments, having turbine engine combustors that are lean in fuel at mid-power or high-power operations, gaseous hydrogen injection may be maintained, for example with a lower mass flow, to get even leaner combustor operation, hence further reducing NOX. However, stopping hydrogen injection for mid power and high-power operations is preferred for minimizing the quantity of gaseous hydrogen needed at overall system level. This could for instance minimize the required size of gaseous hydrogen tanks such as the gas containers 50, 51. Therefore, it is preferred to stop gaseous hydrogen as quickly as possible.

The schedule 72 can be achieved by experiments for minimizing un-burnt hydrocarbons and carbon monoxide emission at a given smaller combustor size for different power output levels in the low power subrange.

Based on the experience of the inventors, the following design factors can be quoted: 10% gaseous hydrogen mass flow for low-power operation would enable combustor size (volume) to be reduced by about 15%, which in turn would reduce the NOX emissions index by about 14%. The lower turbine engine power is, the more useful gaseous hydrogen injection will be.

At medium to high power, and for engines operating with rich primary zone, hydrogen injection will not lead to a particular advantage. There could also be a risk of operating the turbine engine combustor a little leaner, with an associated NOX penalty.

In a further practical embodiment, a low-power condition can be defined as being below about 35% maximum core flow. Mid-power operation would be between about 35% and about 70% maximum core flow. For low-power operations, 5 to 15% gaseous hydrogen mass flow could be injected, the other 95 to 85% being hydrocarbon fuel flow. For the other modes, gaseous hydrogen mass flow is preferred to be zero. If the gas turbine engine 10 is used as an aircraft engine, pressurized gaseous hydrogen is available from the aircraft. In the example of FIGS. 2, 3 exchangeable gas containers 50, 51 are used. In further embodiments (not particularly shown) the hydrogen could be supplied from a fuel reform or from pyrotechnics means.

The invention has been explained with an example of a gas turbine used as an engine of an aircraft. The invention is particularly appropriate for aviation, because aircraft turbine engines are routinely operated at low power for extended periods of time. As an illustration, the engine certification landing and take-off cycles include 26 minutes taxi with engines at low power.

However, the invention is not restricted to aeronautics. The invention could also be used for marine turbine engines or industrial turbine engines.

The $H_2$ injection according to the invention can reduce HC and CO emissions at given combustor volume—with constant NOX emissions, or reduce combustor volume—hence reducing NOX emissions—at constant HC and CO emissions. It is preferred to follow the second path, which is more interesting since NOX is more critical than HC and CO.

As indicated above, "low-power", "mid-power" and "high-power" operations can be defined in terms of percentage of maximum core flow. This is correct, and applies to any kind of gas turbine engine applications—industrial, marine or aviation applications. However, core flow is not directly measured on most turbine engines, and therefore cannot be used as a direct control parameter to switch on/off gaseous hydrogen injection.

It is difficult to give precise switch values, as those will depend on the type of turbine engine application and on the particular design of the gas turbine. Switch levels can easily be optimized by experiments.

In particular, the switch values are different for different applications. Industrial turbine engines are almost always operated at a single point of high power operation, especially at peak efficiency, without transience. It is likely that, in the future, gas turbine engines at power plants will be more and more used to compensate for fluctuations in electrical power generated from regenerative energy sources. Hence, it is more likely that industrial gas turbine engines will be operated over a larger power output range than before. Hence, the invention will be more and more interesting also for industrial power generating gas turbine engines. Aviation turbine engines are already operated in all conditions over a wide power output range with strong requirements for nervous transience. Hence, aviation turbine engines demand much more in terms of operability requirements. Marine turbine engines sit in the middle between industrial turbine engines and aviation turbine engines.

In the afore mentioned embodiment, the turbine engine combustor inlet total temperature is chosen as the switch parameter for controlling switching on/off gaseous hydrogen injection. In a practical embodiment, the gaseous hydrogen injection is shut off when the turbine engine combustor inlet total temperature exceeds a switch temperature value of between 450 and 550° K. A precise value of such a switch temperature would depend on the application. Combustor inlet total temperature is not directly measured on most turbine engines either, and therefore cannot be used as a direct control parameter to switch on/off the gaseous hydrogen injection. However, it is already known that turbine engine control systems re-calculate combustor inlet total temperature based on a turbine engine model which uses measured parameters such as turbine engine core speed and ambient conditions. Such ambient conditions can be or include ambient static pressure and temperature for industrial or marine turbine engines; and ambient static pressure, total pressure and total temperature for aviation turbine engines.

In addition, the turbine engine control system 12 controls the fuel flow to the turbine engine. The same turbine engine control system 12 could also control the gaseous hydrogen flow to the turbine engine, as is shown in FIG. 1.

The invention has been explained with reference to preferred embodiments which are given as examples, only. However, the invention is not limited thereto. For example is it also possible to use a plurality of combustors arranged around the core rotor instead of using a single annular combustor.

LIST OF REFERENCE SIGNS

10 gas turbine engine
12 turbine engine control system
14 housing
16 bypass duct
18 compressor
20 turbine
22 core rotor
24 combustor
26 inlet
28 fan
30 core
32 inner housing
34 fuel supply arrangement
36 hydrocarbon fuel supply
38 nozzle
40 combustor inlet
42 fuel tank
44 fuel duct
46 first controllable valve
48 hydrogen injection arrangement
50, 51 gas container
52 hydrogen duct
54 second controllable valve
56 controller
58 actual power detector
60 comparing means
62 first ambient pressure sensor
64 second ambient pressure sensor
66 ambient temperature
68 core speed sensor
70 gaseous hydrogen flow demand control unit
72 schedule
74 fuel flow demand control unit
76 first line
78 second line
80 combustor exit
82 hydrogen injector
84 fuel injector
86 fuel and air
88 primary zone
90 cooling air
92 dilution air
94 fuel, air and hydrogen
P power output level
ASP ambient static pressure
ATP ambient total pressure
ATT ambient total temperature
$v_C$ core speed
TEM turbine engine model
$T_C$ calculated combustor inlet total temperature
$T_S$ switch temperature
$H_2Fl$ gaseous hydrogen flow
$H_2FD$ gaseous hydrogen flow demand
FFD fuel flow demand
$X_1, \ldots, X_{n-1}, X_n$ other measured parameters

The invention claimed is:

1. A method for operating a gas turbine engine having a compressor joined to a turbine by a core rotor, with at least one combustor disposed therebetween for receiving compressed air from said compressor and fuel for providing combustion gas discharged to said turbine, said method comprising:
   supplying a hydrocarbon fuel to the combustor; and
   injecting hydrogen into said combustor in response to a power output level of said gas turbine engine; wherein,
   said gas turbine is operable at least in a high-power condition, a mid-power condition, and a low-power condition;
   said method further comprises,
   i) supplying said hydrocarbon fuel to said combustor during said high-power, mid-power and low-power conditions;
   ii) starting an injection of hydrogen into said combustor when changing from one of said high-power and the mid-power conditions to said low-power condition; and
   iii) stopping said hydrogen injection when changing from said low-power condition to one of said high-power and mid-power conditions;
   said gas turbine engine is operable in an output power range ranging from a minimum power output to a maximum power output and including said high-power, mid-power and low-power conditions and further including a low-power subrange ranging from said minimum power output to a switch power level within a lower half of said output power range, said low-power subrange including said low-power condition;
   said supplying step comprises supplying said hydrocarbon fuel to the combustor in the whole output power range;
   said starting step comprises starting an injection of hydrogen into the combustor when entering said low-power sub-range; and
   said stopping step comprises stopping said injection of hydrogen when leaving said low-power sub-range;

said method further comprises, x) detecting an actual power condition; and y) comparing the actual power condition with said switch power level;

said detecting an actual power condition includes detecting an ambient pressure, detecting an ambient temperature, and detecting a speed of said core rotor; and said method further calculating a combustor inlet temperature from detected values of the ambient pressure, ambient temperature and core rotor speed.

2. The method of claim 1, wherein:

said switch power level is determined by a switch temperature; and said comparing the actual power condition with the switch power level comprises comparing said calculated combustor inlet temperature with said switch temperature.

3. A method for operating a gas turbine engine having a compressor joined to a turbine by a core rotor, with at least one combustor disposed therebetween for receiving compressed air from said compressor and fuel for providing combustion gas discharged to said turbine said method comprising:

supplying a hydrocarbon fuel to the combustor; and injecting hydrogen into said combustor in response to a power out level of said gas turbine engine; wherein, said method further comprises, i) detecting an actual power condition;

ii) comparing said actual power condition with a schedule of a desired hydrogen flow versus said actual power condition; and iii) supplying a corresponding hydrogen flow for injection into said combustor;

said detecting an actual power condition includes detecting an ambient pressure detecting an ambient temperature and detecting a speed of said core rotor; and said method further comprises calculating a combustor inlet temperature from detected values of the ambient pressure, ambient temperature and core rotor speed.

4. The method of claim 3, wherein:

said actual power condition is determined by said calculated combustor inlet temperature; and said schedule of said desired hydrogen flow versus said actual power condition is a schedule of the desired hydrogen flow versus said calculated combustor condition.

5. A gas turbine engine comprising:

a compressor joined to a turbine by a core rotor;

at least one combustor disposed between said compressor and said turbine for receiving compressed air from said compressor and hydrocarbon fuel for producing combustion gas discharged to said turbine;

a hydrogen injection arrangement for injecting hydrogen into said combustor; and a controller for controlling said hydrogen injection arrangement in response to a power output level of said gas turbine engine; wherein, said gas turbine engine is operable at least in a high-power condition, a mid-power condition and a low-power condition;

said gas turbine engine further comprises a hydrocarbon fuel supply for supplying said hydrocarbon fuel to said combustor during said high-power, mid-power and low-power conditions;

said hydrogen injection arrangement includes at least one valve which is configured at least for starting and stopping hydrogen supply to said combustor;

said controller is configured to detect said high-power, mid-power and low-power conditions and to control said valve in response to a detected power condition, for starting an injection of hydrogen into said combustor when changing from one of said high-power and mid-power condition to said low-power condition, and for stopping said hydrogen injection when changing from said low-power condition to one of said high-power condition and said mid-power conditions;

the controller comprises an actual power detector for detecting an actual power condition and comparing means connected to said actual power detector for comparing said actual power condition with a switch power level that divides said low-power condition from said mid-power condition;

said actual power detector is connected to an ambient pressure sensor for detecting an ambient pressure, to an ambient temperature sensor for detecting an ambient temperature, and to a speed sensor detecting a speed of said core rotor; and said actual power detector comprises calculating means for calculating a combustor inlet temperature from outputs of said ambient pressure sensor, said ambient temperature sensor and said speed sensor.

6. The gas turbine engine of claim 5, wherein said comparing means is configured to compare the output of the calculation means with a switch temperature representing the switch power level.

* * * * *